United States Patent [19]

Borelli et al.

[11] Patent Number: 4,479,819
[45] Date of Patent: Oct. 30, 1984

[54] INFRARED POLARIZING GLASSES

[75] Inventors: Nicholas F. Borelli, Elmira; Frank Coppola, Horseheads; David L. Morse, Corning; Daniel A. Nolan, Corning; Thomas P. Seward, III, Corning, all of N.Y.

[73] Assignee: Corning Glass Works, Corning, N.Y.

[21] Appl. No.: 427,732

[22] Filed: Sep. 29, 1982

[51] Int. Cl.³ .................. C03C 3/26; C03C 23/00; C03B 19/00
[52] U.S. Cl. ........................... 65/30.11; 65/32; 501/13
[58] Field of Search ............ 65/30.11, 32, 30.1, 65/64, 102; 501/13, 77, 56

[56] References Cited

U.S. PATENT DOCUMENTS 3,653,863  4/1972  Araujo et al. ............... 65/30.11
4,304,584 12/1981  Borrelli et al. ............. 65/64 X Primary Examiner—Kenneth M. Schor
Attorney, Agent, or Firm—Clinton S. Janes, Jr.

[57] ABSTRACT

The instant invention is directed to the preparation of glass articles exhibiting excellent polarization in the infrared portion of the spectrum from glasses characterized as containing silver halide particles therein selected from the group of AgCl, AgBr, AgI. The inventive method comprises four general steps:

(a) a batch for a glass containing silver and at least one halide selected from the group of chloride, bromide, and iodide is melted and the melt shaped into a glass body of a desired geometry;

(b) the glass body is subjected to a heat treatment at least above the strain point but not in excess of 50° C. above the softening point of the glass for a period of time adequate to cause the generation of AgCl and/or AgBr and/or AgI particles therein, said particles ranging in size between 200–5000 Å;

(c) the glass body is elongated under stress at temperatures above the annealing point, but below that where said glass exhibits a viscosity of about $10^8$ poises, such that the particles are elongated to an aspect ratio of at least 5:1; and (d) the elongated glass body is exposed to a reducing environment at temperatures between 250° C. and about 25° above the annealing point of the glass to reduce the silver halide particles in the glass to metallic silver which is deposited in and/or upon the elongated particles.

10 Claims, 1 Drawing Figure

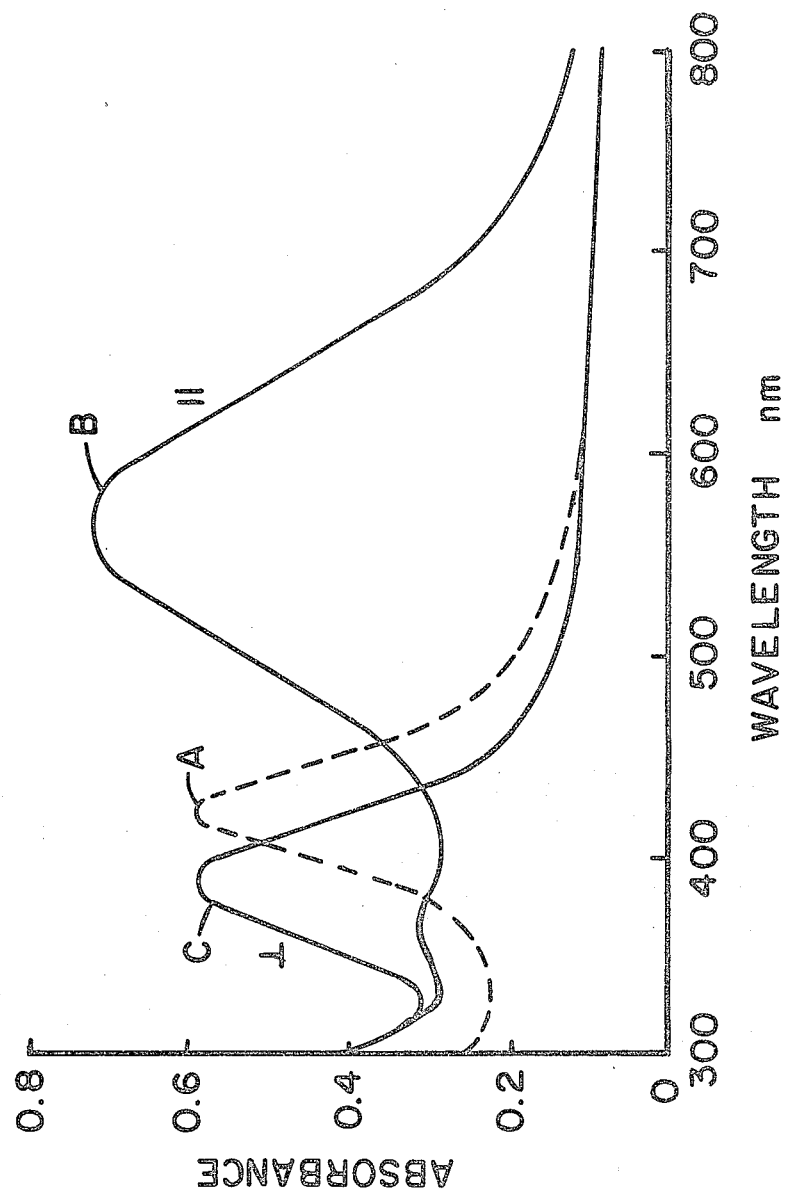

INFRARED POLARIZING GLASSES

BACKGROUND OF THE INVENTION

U.S. Pat. No 4,304,584 describes the production of glasses exhibiting polarizing properties, i.e., glasses displaying dichroic ratios up to 40 and higher, from two types of silver-containing glasses: (1) phase separable glasses; and (2) glasses demonstrating photochromic behavior because of the presence of particles of a silver halide selected from the group of AgCl, AgBr, and AgI. The method for preparing the polarizing glasses contemplates two fundamental steps: (a) elongating the base glass articles under stress via such methods as drawing, extruding, redrawing, rolling, or stretching at temperatures between the annealing point and softening point of the glasses to cause the glass phases in the phase separable glasses or the silver halide particles in the photochromic glasses to become elongated and aligned in the direction of the stress; and (b) heat treating the elongated glass articles in a reducing environment at a temperature below the annealing point of the glasses, but above about 300° C., to reduce at least a portion of the silver ions in the glass to metallic silver which is deposited in at least one of the elongated glass phases and/or along the phase boundaries of the elongated glass phases and/or deposited upon the elongated silver halide particles. The most efficient heat treatment is stated to comprise a temperature between about 375°–450° C. in a hydrogen atmosphere. Polarization was discerned in the visible and near infrared portions of the radiation spectrum.

In the case of phase separable, non-photochromic glasses, the operable compositions are asserted to reside in the alkali metal aluminoborosilicate field. Thus, suitable glasses will commonly consist essentially, in weight percent, of about 5–12% alkali metal oxide, 20–35% $B_2O_3$, 1–15% $Al_2O_3$, and the remainder $SiO_2$, but with the proviso that, where $Al_2O_3$ is included in amounts in excess of 5%, a specific phase separation agent such as CdO and/or F must be present at a level of at least 1%.

The base composition of an operable photochromic glass is noted as being essentially immaterial so long as AgCl and/or AgBr and/or AgI constitute the photochromic agents, although large amounts, viz., >10% by weight total, of PbO and/or other readily-reducible metal oxides will be avoided.

That patent also discloses the production of composite bodies formed via concurrent extrusion of different glass compositions, that practice being operable with both phase separable glasses and photochromic glasses. In general, the composite body will consist of a thin surface layer or skin enveloping a thicker interior portion or core.

Thus, with respect to silver halide-containing photochromic glasses, it had been recognized in the art that the subjection of such glasses to high temperatures led to the growth of relatively large silver halide particles, the dimensions of the particles becoming so large as to cause light scattering with the consequent development of a hazy appearance. It was found, however, that the larger particles required less mechanical stress to effect elongation thereof and resisted the tendency to respheroidize to a much greater extent. Accordingly, it was deemed useful to form a laminated article comprising a thin skin glass which has been subjected to a relatively high heat treatment to generate large silver halide crystals therein and an interior portion that has been subjected to a less severe heat treatment to produce a transparent photochromic glass. Subsequent elongation of the composite body results in a thin skin exhibiting high polarization and a transparent core displaying good photochromic behavior. And, because the cross section of the skin glass is very thin, any haze developed therein will customarily have very little effect upon the optical transmission of the composite.

As can be appreciated, inasmuch as the polarization derived from the heat treatment conducted under reducing conditions is normally limited to a thin surface layer, typically 10–100 microns, the phase separable or photochromic glass need only comprise the surface layer of the composite, if so desired. Hence, the use of composite articles lends even wider versatility to the process. For example, only the skin layer is required to be elongated uniformly; the size, shape, and alignment of the particles in the core glass have little effect upon the polarization character of the final product. Furthermore, the production of laminated articles is economically attractive inasmuch as only the thin surface layer need include the relatively expensive silver-containing materials.

That patented procedure was shown to produce excellent polarization in the visible portion of the radiation spectrum with values therefor being reported at 550 nm and 600 nm, those wavelengths lying near the center of the visible region of the spectrum. For certain applications, however, it would be desirable to have glasses that exhibit good polarizing character in the infrared area of the spectrum, i.e., at wavelengths longer than 700 nm. The currently-available sheet-type and wire grid polarizers often display poor performances over the wavelengths between 700 nm–3000 nm because of their poor polarizing properties and/or poor chemical, mechanical, or thermal durability.

Therefore, the principal objective of the instant invention is to produce glasses demonstrating excellent polarizing properties over the infrared portion of the radiation spectrum, most preferably the region of 700–3000 nm. Polarizing properties up to the long wavelength transmission cutoff of the base glass, i.e., in the region of 3–5 microns, are, however, within the scope of the invention.

Another objective is to provide glass compositions especially suitable for exhibiting polarizing behavior of high quality over the infrared portion of the radiation spectrum, most preferably the region of wavelengths between 700–3000 nm.

BRIEF DESCRIPTION OF THE DRAWING

FIG. 1 presents curves representing absorption bands produced by silver particles in glass both in the base state and when elongated to produce polarization.

SUMMARY OF THE INVENTION

FIG. 1 illustrates that the presence of small, relatively spherical particles of silver in glass gives rise to an absorption band typified by dotted curve A. When the silver particles are elongated and aligned in a single direction, that band divides into two branches appropriate to visible light polarized parallel ($\parallel$) or perpendicular ($\perp$) to the elongation axis, represented by curves B and C, respectively.

This behavior is relatively unique to metallic silver. The absorption peak is due to a plasma resonance of the conduction electrons, the wavelength location of which can be shifted by changing the shape of the boundary (particle surface). Base metals, e.g., lead and bismuth, do not exhibit such resonance. Copper and gold are characterized by strong interband electronic transitions which detract from the conduction electron resonance.

The location of the long wavelength or parallel peak depends upon the aspect ratio of the particles, i.e., the ratio of length:width of the particles. For applications desiring polarization in the visible range of wavelengths, the most preferred location of the parallel peak will be approximately the center of the visible region of the spectrum or slightly to the long wavelength side of the peak of the eye sensitivity curve (~550 nm). For applications requiring polarization in the infrared portion of the radiation spectrum, the most preferred location of the parallel peak will be within the infrared region, i.e., at wavelengths greater than 700 nm, so that it provides strong absorption beyond 700 nm.

The dichroic ratio is defined as the ratio existing between the parallel band absorption and that of the tail of the short wavelength or perpendicular absorption band; the sharper (taller and narrower) the peaks, the higher the dichroic ratio. Sharp peaks result from relatively small particles. Nevertheless, the particle diameters must not be too small. For example, where the particle size is considerably smaller than about 100Å, i.e., less than about 50Å, the mean-free-path limitations to the conduction electrons again cause the peak to broaden. However, small particles demand very high elongation stresses to develop the necessary aspect ratio in the silver-containing particles. And, because the likelihood of glass body breakage during a stretching-type elongation process is directly proportional to the surface area of the glass body under stress, there is the very practical limitation as to the level of stress that can be applied to a glass sheet or other body of significant bulk. Generally, a stress level of a few thousand psi has been deemed to constitute a practical limit. Furthermore, although the stresses are compressive, high stresses are difficult to achieve in the elongation region of an extrusion die even with very high chamber pressures, e.g., 20,000 psi and higher. Again, a stress level of a few thousand psi has been deemed a practical limit which can be applied to the particles.

Accordingly, the crux of the instant invention was to develop means for producing silver-containing particles of sufficient size such that they can be readily elongated but which, upon elongation, will demonstrate aspect ratios suitable for locating the long wavelength peak at about and beyond 700nm.

Electron microscopy and X-ray diffraction analysis have demonstrated that silver halide particles are reduced to silver metal when a glass containing such particles is subjected to a heat treatment in a reducing atmosphere. However, the silver metal occupies a smaller volume than the precursor silver halide particle and exhibits a lower aspect ratio. Therefore, the aspect ratio of the silver halide particles must be greater than twice and, preferably, at least thrice that desired in the silver metal particles to achieve the sought for polarization.

Fundamentally, the means for accomplishing the above-cited principal objective contemplates four general steps:

(1) a batch for a glass containing silver and at least one halide selected from the group of chloride, bromide, and iodide is melted and the melt shaped into a glass body of a desired configuration;

(2) the glass body is subjected to a defined heat treatment to cause the generation of silver halide particles therein of a desired size;

(3) the glass body is elongated under stress within a defined temperature range to elongate said silver halide particles and to align them in the direction of the stress; and (4) the elongated glass body is exposed to a reducing environment within a defined temperature range to reduce at least a portion of the silver halide particles to elemental or metallic silver which is deposited in and/or upon said elongated particles.

The observance of the heat treating parameters of each of Steps (2), (3), and (4) is vital to achieving the desired properties in the final product. To illustrate, the generation of silver halide particles in the glass body required temperatures above the strain point, preferably above the annealing point, and, where physical support is provided for the glass body as, for example, confinement in a mold, temperatures 50° C. in excess of the softening point of the glass can be utilized. Temperatures above the annealing point are economically desirable since, as is well-recognized in the art, particle growth occurs more rapidly as the temperature is raised, provided the maximum solubility temperature of the particles is not exceeded.

The elongation of the glass body (and the silver halide particles previously generated therein) will be conducted at temperatures above the annealing point but below the softening point of the glass, i.e., at temperatures where the glass exhibits a viscosity greater than $10^8$ poises. In general, the elongation will be carried out at temperatures at least 50° C. below the softening point to allow high stresses to be developed and to prevent respheroidization particles. Laboratory experimentation has demonstrated that silver halide particles can be elongated at lower stresses than silver metal particles and yet will provide excellent polarization properties after reduction to elemental or metallic silver. Although not unequivocally proven, the reason for this behavior of silver halide particles vis-a-vis silver particles is believed to be twofold: first, because the glass-silver halide particle interface has a lower surface tension than the glass-silver metal interface; and, second, because the silver halide entity is larger than the corresponding amount of elemental silver and, hence, exhibits less surface curvature and, therefore, less surface tension generated pressure, with the necessary consequence that it stretches more easily. Evidence supporting that reasoning is found in the fact that elongated metallic silver particles are subject to respheroidization at temperatures about the strain point of a glass, whereas elongated silver halide particles resist respheroidization to higher temperatures.

Nevertheless, firing of the elongated body in a reducing environment will be carried out at temperatures above about 250° C. but no higher than 25° C. above the annealing point and, preferably, somewhat below the annealing point of the glass to again preclude any tendency of the particles to respheroidize. Thus, to repeat, the elongated configuration of the silver and silver halide particles is quite unstable and even the slightest relaxation in the residual glass matrix will permit the particles to move toward their stable state. Glass relaxation is essentially absent at temperatures below the strain point thereof. The particle elongation can be deemed permanent at such low temperatures.

In a similar manner to the disclosure of U.S. Pat. No. 4,304,584, the process parameters of the instant invention are applicable with any glass which is characterized as containing silver halide particles therein selected from the group of AgCl, AgBr, and AgI, whether or not the glass evidences photochromic behavior. U.S. Pat. No. 4,304,584 refers to U.S. Pat. No. 3,208,860, the basic patent in the field of photochromic glass. That patent broadly discloses silicate-based glass compositions which display photochromic behavior because of the presence of silver halide crystals therein selected from the group of AgCl, AgBr, and AgI. The preferred glass compositions cited in the patent consisted essentially, expressed in terms of weight percent on the oxide basis, of 40–76% $SiO_2$, 4–26% $Al_2O_3$, 4–26% $B_2O_3$, and at least one alkali metal oxide selected from the group of 2–8% $Li_2O$, 4–15% $Na_2O$, 6–20% $K_2O$, 8–25% $Rb_2O$, and 10–30% $Cs_2O$, at least one halogen in the indicated minimum proportion of 0.2% Cl, 0.1% Br, and 0.08% I, and a minimum of Ag in the indicated proportion of 0.2% where the halogen is Cl, 0.05% in a glass containing at least 0.1% Br, and 0.03% in a glass containing at least 0.08% I, the sum of the base glass components, silver, and halogen constituting at least 85% of the total glass. Besides the above-recited required components, the patent discloses the optional inclusion of fluorine, bivalent metal oxides such as CaO, SrO, MgO, BaO, and ZnO, and $P_2O_5$. The present inventive process is operable with such glass compositions, provided that substantial amounts of readily reducible metal oxides such as PbO and $Bi_2O_3$ are not present therein. Where the inventive products are destined for use in ophthalmic applications, i.e., there is a desire for a glass demonstrating rapid fading capability and relative independence to changes in temperature, the preferred photochromic glasses are those described in U.S. Pat. No. 4,190,451 which consist essentially, expressed in terms of weight percent on the oxide basis, of 8–20% $R_2O$, wherein $R_2O$ consists of 0–2.5% $Li_2O$, 0–9% $Na_2O$, 0–17% $K_2O$, and 0–6% $Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, the molar ratio $R_2O:B_2O_3$ ranging between about 0.55–0.85, where the composition is essentially free from divalent metal oxides other than CuO, and the weight ratio Ag:(Cl+Br) ranging about 0.65–0.95. Self-evidently, however, there are applications for photochromic glasses other than in the ophthalmic field where slower fading, and/or deeper darkening, and/or strong temperature dependence can be tolerated or which may actually be desirable. Such glasses are also included in the present inventive process. Furthermore, where, as here, polarization in the infrared portion of the radiation spectrum, rather than the visible region, is of prime importance, the development of haze in the visible region of the spectrum is of no moment. Accordingly, where ophthalmic properties are not demanded, a preferred range of glasses will include those described in U.S. Pat. No. 4,190,451, supra, but wherein the $R_2O$ content varies about 6–20%.

As is well known to the art, the actinic radiation promoting photochromic behavior in silver halide-containing glasses lies in the ultraviolet region of the spectrum. It has been found that the dichroic ratio and, hence, the polarization performance are somewhat decreased when a polarizing photochromic glass darkens in the presence of ultraviolet radiation. In the above-described preferred range of photochromic glass compositions, copper performs as a sensitizing agent; i.e., the glass will contain silver halide crystals but will display essentially no photochromic character in the absence of copper or with very high levels of copper, i.e., in excess of 2% by weight copper. Accordingly, where photochromism is not desired, copper will generally be omitted from the glass composition or utilized only at a very low level, since excessive amounts of copper disadvantageously color the glass. Nonetheless, when copper is entirely absent from the composition, care must be exercised during melting of the batch ingredients to avoid reduction of the silver ions to metallic silver. Thus, for example, alkali metal oxides may be added to the batch as nitrates or other techniques well known to the glass technologist may be used to maintain oxidizing conditions. Also, as a general rule, easily-reducible metal oxides such as PbO and $Bi_2O_3$ will be avoided to preclude their possible reduction along with the silver ions during the heat treatment in the reducing environment. This situation would lead to a broadening of the silver peak and a decrease in dichroic ratio. One especially desirable glass of the former type has the following composition, expressed in terms of parts by weight on the oxide basis:

|         |       |
|---------|-------|
| $SiO_2$ | 57.9  |
| $B_2O_3$ | 18.9  |
| $Al_2O_3$ | 6.27  |
| $Na_2O$ | 4.13  |
| $Li_2O$ | 1.84  |
| $K_2O$  | 5.79  |
| $ZrO_2$ | 5.05  |
| Ag      | 0.25  |
| Cl      | 0.226 |
| Br      | 0.14  |

Inasmuch as the sum of the above components closely approximates 100, for all practical purposes the individual values may be considered to reflect weight percent.

It was observed in Patent No. 4,190,451 that maintaining the molar ratio $(R_2O-Al_2O_3):B_2O_3$ at a low level causes the glass to exhibit little photochromic darkening. Accordingly, another composition regime wherein silver halide crystals can be developed, but the glass will not demonstrate significant photochromism even when copper is present, lies in the region of glasses wherein the molar ratio $(R_2—Al_2O_3):B_2O<0.25$, although the addition of at least 0.01% by weight CdO may promote photochromism.

Yet another area of compositions containing silver halide crystals, but which will not display significant photochromic behavior even when copper is included, involves glasses having base compositions with greater than 26% by weight $B_2O_3$. In general, such base glasses will consist essentially, expressed in terms of weight percent on the oxide basis, of about 5–12% alkali metal oxides, 1–15% $Al_2O_3$, 27–35% $B_2O_3$, and the remainder $SiO_2$, and wherein the molar ratio $(R_2O—Al_2O_3):B_2O_3$ is most preferably less than 0.25. Again, the addition of CdO in an amount of at least 0.01% may cause the development of photochromism. A particularly desirable example of such a glass has the composition recited below, literally expressed in terms of parts by weight on the oxide basis, but which may, for all practical purposes, be deemed to be stated in terms of weight percent:

| | |
|---|---|
| SiO2 | 51.8 |
| B2O3 | 31.0 |
| Al2O3 | 7.8 |
| Na2O | 9.8 |
| Ag | 0.18 |
| Cl | 0.52 |
| Br | 1.2 |
| F | 1.2 |
| CuO | 0.03 |

Experience has indicated that the silver halide particles developed during the initial heat treatment (prior to elongation) should exhibit diameters of at least about 200Å in order to assume, upon elongation, aspect ratios of at least 5:1 such that, upon reduction to elemental silver particles, those latter particles will display aspect ratios greater than 2:1 to insure the placement of the long wavelength peak at least near the edge of the infrared portion of the radiation spectrum, while avoiding serious breakage problems during the elongation process. Conversely, the diameters of the initial particles ought not to exceed about 5000Å, lest the body exhibit considerable translucency and a decreased dichroic ratio due to radiation scattering effects.

RELATED APPLICATION

U.S. application Ser. No. 427,510, filed concurrently with the present application under the title *Drawing Laminated Polarizing Glasses*, discloses a method for making a composite glass body exhibiting polarizing character. The method comprises providing a core glass element having silver-containing particles therein, cladding the core glass element with a skin glass having a viscosity at the softening point of the core glass which is considerably less than that of the core glass, and stretching the so-formed laminated body at a temperature above the annealing point of the core glass to thereby elongate the silver-containing particles to impart polarizing properties to the glass core. The low viscosity skin glass inhibits rupturing of the glass core during the stretching step.

DESCRIPTION OF PREFERRED EMBODIMENTS

The following table records a number of glass compositions, expressed in terms of parts by weight on the oxide basis, to illustrate the inventive method. Because the total of the individual constituents closely approximates 100, for all practical purposes the tabulated values can be deemed to reflect weight percent. Inasmuch as it is not known with which cation(s) the halogens are combined, they are simply reported as halides, in accordance with conventional glass analysis practice. Finally, because the quantities of silver employed are so small, they are merely listed as Ag.

The actual batch ingredients may comprise any materials, either the oxides or other compounds, which, when melted in combination with the other components, will be converted into the desired oxide in the proper proportions. The batch components were compounded, ballmilled together to assist in obtaining a homogeneous melt, and either charged into platinum crucibles or into a small laboratory continuous melting unit. The batches were melted at about 1300°–1450° C., the melts cast as bars having dimensions of about 2.5"×0.25"×18", drawn as sheet having a width of about 8"and a thickness of about 0.375", or cast as cylindrical bars with a diameter of about 2.5" and a length of 10", and those bodies annealed at about 450° C. Table I also reports the photochromic behavior (PC) of the compositions.

TABLE I

| | 1 | 2 | 3 | 4 | 5 | 6 |
|---|---|---|---|---|---|---|
| SiO2 | 51.8 | 51.8 | 58.6 | 57.9 | 57.9 | 55.8 |
| B2O3 | 31.0 | 31.0 | 18.3 | 18.9 | 18.9 | 18.0 |
| Al2O3 | 7.8 | 7.8 | 9.5 | 6.27 | 6.27 | 6.48 |
| Na2O | 9.8 | 9.8 | 1.7 | 4.13 | 4.13 | 4.04 |
| K2O | — | — | 9.8 | 5.79 | 5.79 | 5.76 |
| Li2O | — | — | 1.9 | 1.84 | 1.84 | 1.88 |
| Ag | 0.18 | 0.18 | 0.32 | 0.25 | 0.25 | 0.24 |
| Cl | 0.52 | 0.52 | 0.30 | 0.226 | 0.226 | 0.20 |
| Br | 0.60 | 1.2 | 0.15 | 0.14 | 0.14 | 0.13 |
| F | 1.26 | 1.2 | — | — | — | — |
| CuO | 0.03 | 0.03 | 0.016 | — | 0.012 | 0.011 |
| CdO | 0.09 | — | — | — | — | — |
| PbO | — | — | 0.12 | — | — | — |
| ZrO2 | — | — | — | 5.05 | 5.05 | 4.89 |
| PC | Yes | No | Yes | No | Yes | Yes |

Table II recites the heat treatment times and temperatures utilized to develop silver halide particles in several of the glasses of Table I and the average diameter (in Angstroms) of the particles generated, as measured via electron microscopy. Table II also records the elongation process applied to specimens of each glass via redrawing, including the temperature of redrawing, the stress applied (in psi) and the average aspect ratio demonstrated by the elongated particles, again as determined via electron microscopy.

The reducing treatment was carried out on ground and polished specimens cut from the elongated bars and sheets in a laboratory furnace fitted with a stainless steel tube through which an appropriate gas can be passed. Because of the well-recognized inherent superiority of hydrogen as a reducing environment, it was utilized in the described studies. Nonetheless, it will be appreciated that other well-known reducing atmospheres such as cracked ammonia, combinations of CO and CO2, and mixtures of hydrogen with other gases, for example, forming gas, will similarly be effective, although customarily requiring a longer exposure period than with hydrogen gas to secure the same effect. In general, the elongated articles will be exposed to the reducing atmosphere for a sufficient period of time to develop a reduced surface layer having a thickness of at least 10 microns and, preferably, about 50 microns (~0.002"). Table II also lists the time and temperature of the reduction treatment to which the elongated samples were subjected.

TABLE II

| Example | Heat Treatment | Particle Size | Elongation Conditions | Aspect Ratio | Reduction Treatment |
|---|---|---|---|---|---|
| 3 | 720° C. for 20 minutes | 620 | 555°–565° C.–4600 psi | 10.7 | 430° C. for 3 hours |
| 3 | 720° C. for 6 hours | 953 | 555°–565° C.–1700 psi | 7.5 | 430° C. for 3 hours |
| 6 | 720° C. for 3 hours | *NM | 570°–590° C.–4400 psi | NM | 430° C. for 2 hours |
| 6 | 720° C. for 3 hours | NM | 570°–590° C.–4800 psi | NM | 430° C. for 2 hours |
| 6 | 720° C. for 2 hours | NM | 570°–590° C.–2700 psi | NM | 430° C. for 2 hours |
| 6 | 720° C. for 4 hours | NM | 570°–590° C.–2900 psi | NM | 430° C. for 2 hours |

TABLE II-continued

| Example | Heat Treatment | Particle Size | Elongation Conditions | Aspect Ratio | Reduction Treatment |
|---|---|---|---|---|---|
| 6 | 675° C. for 4 hours | NM | 550°–570° C.–2200 psi | NM | 430° C. for 2 hours |

*NM = Not Measured

Table III reports heat treatment temperatures and times employed for developing silver halide particles in several of the glasses of Table I along with the elongation parameters applied to samples of those glasses via extrusion, including the maximum temperature and the maximum hydraulic pressure applied to cylindrical bars in the extrusion process. This pressure cannot be directly compared with the drawing stress of Table II since there is a stress gradient which decreases to 0 at the exit of the extrusion die. Again, electron microscopy was utilized to measure the average diameter of the particles and the average aspect ratio demonstrated by them. Table III also lists the temperature and time of the reduction treatment to which the elongated specimens were subjected, a hydrogen atmosphere again constituting the reducing environment.

TABLE III

| Example | Heat Treatment | Particle Size | Elongation Conditions | Aspect Ratio | Reduction Treatment |
|---|---|---|---|---|---|
| 4 | 700° C. for 10 hours | 670 | 610° C.–33,000 psi | 7.2 | 455° C. for 5.5 hours |
| 5 | 700° C. for 10 hours | 730 | 610° C.–33,000 psi | 5.4 | 450° C. for 4 hours |

The polarization character of the redrawn and extruded samples was examined subsequent to the hydrogen firing treatment employing a spectrophotometer equipped with a polarizer and rotatable sample holder. The wavelength at which maximum absorption was observed (the long wavelength or parallel peak), the transmittance of radiation polarized parallel ($T_\parallel$) and perpendicular ($T_\perp$) to the elongation axis, the dichroic ratio (DR) at that peak, and the polarization efficiency (PE) exhibited by the specimens are included in Table IV. $PE = T_\perp - T_\parallel : T_\perp + T_\parallel$ Because good polarization can occur at wavelengths removed somewhat from that of the peak absorption, data are also included in Table IV for longer wavelengths, viz., where $T_\perp = 0.01$ (1%) and 0.1 (10%).

the radiation spectrum from glasses which will be phase separable or will be photochromic through the presence of silver halide particles therein selected from the group of AgCl, AgBr, and AgI, which method comprises the steps of:

(a) melting a batch for a glass containing silver and at least one halide selected from the group of chloride, bromide, and iodide;

(b) cooling and shaping said melt into a glass article of a desired configuration;

(c) subjecting said glass article to a temperature at least above the strain point, but not in excess of about 50° C. above the softening point of the glass, for a sufficient length of time to cause the generation of silver halide particles therein selected from the group of AgCl, AgBr, and AgI, said particles ranging in size between about 200–5000Å;

(d) elongating said glass article under stress at a temperature above the annealing point, but below that where said glass exhibits a viscosity of about $10^8$ poises, such that said silver halide particles are elongated to an aspect ratio of at least 5:1 and aligned in the direction of the stress; and (e) exposing said elongated glass article to a reducing atmosphere at a temperature above about 250° C., but no higher than about 25° C. above the annealing point of the glass, for a sufficient length of time to develop a reduced surface layer on said glass article having a thickness of at least 10 microns wherein at least a portion of said elongated silver halide particles are reduced to elemental silver

TABLE IV

| | | Maximum Absorption | | | | $T_\parallel = 0.01$ | | | $T_\parallel = 0.1$ | | |
|---|---|---|---|---|---|---|---|---|---|---|---|
| Example | Elongation | Wavelength | $T_\perp$ | $T_\parallel$ | DR | PE | Wavelength | $T_\perp$ | PE | Wavelength | $T_\perp$ | PE |
| 3 | Redrawn | 830 nm | 0.905 | <0.001 | >69 | >99.8 | 1000 nm | 0.910 | 97.8 | 1180 nm | 0.915 | 80.8 |
| 3 | Redrawn | 800 nm | 0.820 | <0.001 | >35 | >99.8 | 830 nm | 0.835 | 97.6 | 935 nm | 0.860 | 79.2 |
| 6 | Redrawn | 1100 nm | 0.915 | <0.001 | >78 | >99.8 | 1250 nm | 0.920 | 97.9 | 1390 nm | 0.920 | 80.4 |
| 6 | Redrawn | 1200 nm | 0.915 | <0.001 | >78 | >99.8 | 1370 nm | 0.920 | 97.9 | 1450 nm | 0.920 | 80.4 |
| 6 | Redrawn | 1400 nm | 0.920 | <0.001 | >83 | >99.8 | 1530 nm | 0.925 | 97.9 | 1665 nm | 0.920 | 80.4 |
| 6 | Redrawn | 1150 nm | 0.920 | 0.001 | >83 | >99.8 | 1260 nm | 0.920 | 97.9 | 1400 nm | 0.920 | 80.4 |
| 2 | Redrawn | 1250 nm | 0.925 | <0.001 | >89 | >99.8 | 1400 nm | 0.925 | 97.9 | 1530 nm | 0.925 | 80.5 |
| 4 | Extruded | 850 nm | 0.890 | <0.001 | >59 | >99.8 | 900 nm | 0.905 | 97.8 | 1025 nm | 0.935 | 80.6 |
| 5 | Extruded | 850 nm | 0.825 | <0.001 | >36 | >99.8 | 950 nm | 0.880 | 9.78 | 1055 nm | 0.895 | 79.9 |

As can be observed from Table IV, the polarization characteristics of the elongated glasses are very excellent at the wavelength of maximum absorption and remain relatively good at wavelengths removed from that peak.

As can be appreciated, the cited glass compositions may also be formed into laminated structures after the manner described in Ser. No. 427,510, supra.

We claim:

1. A method for making a glass article exhibiting excellent polarizing properties in the infrared region of particles having aspect ratios greater than 2:1 which are deposited in and/or upon said elongated particles, whereby said glass article exhibiting excellent polarizing properties in the infrared region of the radiation spectrum is formed.

2. A method according to claim 1 wherein said photochromic glass consists essentially, expressed in terms of weight percent on the oxide basis, of 6–20% $R_2O$, wherein $R_2O$ consists of 0–2.5% $Li_2O$, 0–9% $Na_2O$, 0–17% $K_2O$, and 0–6% $Cs_2O$, 14–23% $B_2O_3$, 5–25%

Al₂O₃, 0-25% P₂O₅, 20-65% SiO₂, 0.004-0.02% CuO, 0.15-0.3% Ag, 0.1-0.25% Cl, and 0.1-0.2% Br, the molar ratio R₂O:B₂O₃ ranging between about 0.55-0.85, where the composition is essentially free from divalent metal oxides other than CuO, and the weight ratio Ag:(Cl+Br) ranging about 0.65-0.95.

3. A method according to claim 1 wherein said phase separable glass is essentially free from CuO and consists essentially, expressed in terms of weight percent on the oxide basis, of 6-20% R₂O, wherein R₂O consists of 0-2.5% Li₂O, 0-9% Na₂O, 0-17% K₂O, and 0-6% Cs₂O, 14-23% B₂O₃, 5-25% Al₂O₃, 0-25% P₂O₅, 20-65% SiO₂, 0.15-0.3% Ag, 0.1-0.25% Cl, and 0.1-0.2% Br, the molar ratio R₂O:B₂O₃ ranging between about 0.55-0.85, where the composition is essentially free from divalent metal oxides, and the weight ratio Ag:(Cl+Br) ranging about 0.65-0.95.

4. A method according to claim 3 wherein said glass consists essentially, expressed in terms of parts by weight on the oxide basis, of:

| | |
|---|---|
| SiO₂ | 57.9 |
| B₂O₃ | 18.9 |
| Al₂O₃ | 6.27 |
| Na₂O | 4.13 |
| Li₂O | 1.84 |
| K₂O | 5.79 |
| ZrO₂ | 5.05 |
| Ag | 0.25 |
| Cl | 0.226 |
| Br | 0.14 |

5. A method according to claim 1 wherein said phase separable glass consists essentially, expressed in terms of weight percent on the oxide basis, of 6-20% R₂O, wherein R₂O consists of 0-2.5% Li₂O, 0-9% Na₂O, 0-17% K₂O, and 0-6% Cs₂O, 14-23% B₂O₃, 5-25% Al₂O₃, 0-25% P₂O₅, 20-65% SiO₂, 0.004-0.02% CuO, 0.15-0.3% Ag, 0.1-0.25% Cl, and 0.1-0.2% Br, the molar ratio R₂O:B₂O₃ ranging between about 0.55-0.85, where the composition is essentially free from divalent metal oxides other than CuO, the weight ratio Ag:(Cl+Br) ranging between about 0.65-0.95, and the molar ratio (R₂O–Al₂O₃):B₂O₃ <0.25.

6. A method according to claim 2 wherein said photochromic glass consists essentially, expressed in terms of weight percent on the oxide basis, of 6-20% R₂O, wherein R₂O consists of 0-2.5% Li₂O, 0-9% Na₂O, 0-17% K₂O, and 0-6% Cs₂O, 14-23% B₂O₃, 5-25% Al₂O₃, 0-25% P₂O₅, 20-65% SiO₂, 0.004-0.02% CuO, 0.15-0.3% Ag, 0.1-0.25% Cl, and 0.1-0.2% Br, and at least 0.01% CdO, the molar ratio R₂O:B₂O₃ ranging between about 0.55-0.85, where the composition is essentially free from divalent metal oxides other than CuO, the weight ratio Ag:(Cl+Br) ranging between about 0.65-0.95, and the molar ratio (R₂O—Al₂O₃):-B₂O₃ <0.25.

7. A method according to claim 1 wherein said phase separable glass contains silver halide particles and copper and consists essentially, expressed in terms of weight percent on the oxide basis, of about 5-12% alkali metal oxides, 27-35% B₂O₃, 1-15% Al₂O₃, and the remainder SiO₂.

8. A method according to claim 7 wherein said glass consists essentially, expressed in terms of parts by weight on the oxide basis, of:

| | |
|---|---|
| SiO₂ | 51.8 |
| B₂O₃ | 31.0 |
| Al₂O₃ | 7.8 |
| Na₂O | 9.8 |
| Ag | 0.18 |
| Cl | 0.52 |
| Br | 1.2 |
| F | 1.2 |
| CuO | 0.03 |

9. A method according to claim 1 wherein said photochromic glass contains silver halide particles and copper and consists essentially, expressed in terms of weight percent on the oxide basis, of about 5-12% alkali metal oxides, 27-35% B₂O₃, 1-15% Al₂O₃, at least 0.01% CdO, and the remainder SiO₂.

10. A method according to claim 1 wherein said glass body is elongated at a temperature above the annealing point but at least 50° C. below the softening point of the glass.

* * * * *

UNITED STATES PATENT AND TRADEMARK OFFICE
CERTIFICATE OF CORRECTION

PATENT NO. : 4,479,819
DATED : October 30, 1984
INVENTOR(S) : Nicholas F. Borrelli et al.

It is certified that error appears in the above-identified patent and that said Letters Patent is hereby corrected as shown below:

Column 1, line 38, "1-15% Al hd $2O_3$" should read -- 1-15% $Al_2O_3$ --.

Column 4, line 38, between "respheriodization" and "particles" insert -- of the --.

Column 6, line 49, "$R_2-Al_2O_3$)" should read -- ($R_2O-Al_2O_3$) --.

Column 9, line 5, "6" (under heading "Example") should read -- 2 --.

Signed and Sealed this

Second Day of July 1985

[SEAL]

Attest:

DONALD J. QUIGG

Attesting Officer    Acting Commissioner of Patents and Trademarks